(12) United States Patent
Yamada

(10) Patent No.: US 11,892,118 B2
(45) Date of Patent: Feb. 6, 2024

(54) DISPLAY STAND AND DISPLAY STAND SYSTEM

(71) Applicant: Masamichi Yamada, Kanagawa (JP)

(72) Inventor: Masamichi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 434 days.

(21) Appl. No.: 17/299,314

(22) PCT Filed: Feb. 13, 2020

(86) PCT No.: PCT/JP2020/005643
§ 371 (c)(1),
(2) Date: Jun. 3, 2021

(87) PCT Pub. No.: WO2020/170948
PCT Pub. Date: Aug. 27, 2020

(65) Prior Publication Data
US 2022/0395093 A1    Dec. 15, 2022

(30) Foreign Application Priority Data

Feb. 20, 2019  (JP) ................................ 2019-028865
Dec. 16, 2019  (JP) ................................ 2019-226763

(51) Int. Cl.
*F16M 11/10*       (2006.01)
*F16M 11/04*       (2006.01)

(52) U.S. Cl.
CPC ......... *F16M 11/105* (2013.01); *F16M 11/046* (2013.01)

(58) Field of Classification Search
CPC .... F16M 11/22; F16M 11/046; F16M 11/105; F16M 2200/041; F16M 11/42;
(Continued)

(56) References Cited

U.S. PATENT DOCUMENTS

| 6,390,433 | B1  | 5/2002 | Kasa-Djukic |
| 7,752,712 | B2 * | 7/2010 | Chuan ................. H04M 1/0237 16/361 |

(Continued)

FOREIGN PATENT DOCUMENTS

| JP | H06-507557  | 9/1994  |
| JP | 2016-018089 | 2/2016  |
| JP | 2019-219540 | 12/2019 |

OTHER PUBLICATIONS

International Search Report dated Apr. 20, 2020 in PCT/JP2020/005643 filed on Feb. 13, 2020, 8 pages.

*Primary Examiner* — Hiwot E Tefera
(74) *Attorney, Agent, or Firm* — XSENSUS LLP

(57) ABSTRACT

A display stand includes a stand unit having posts and a mounting mechanism; and a mounting bracket on a back surface of a display. The mounting bracket includes first, second, and third fixing members extending from the back surface of the display, the mounting mechanism includes a mounting plate forming at least a part of a transverse plate that connects between the posts, the mounting plate including a straight rail part having a straight slot and a bent rail part having a bent slot that is bent at a substantially right angle. The first fixing member engages with the straight rail part and is linearly movable when the display rotates, and the second fixing member and the third fixing member each engage with the bent rail part and are movable along straight portions of the bent rail part when the display rotates.

9 Claims, 16 Drawing Sheets

(58) Field of Classification Search
CPC ............... F16M 11/2021; F16M 11/10; F16M 11/2028; G06F 1/1601; G06F 2200/1612; G06F 1/1622; G06F 1/1607; A47B 81/065
See application file for complete search history.

(56) References Cited

U.S. PATENT DOCUMENTS

| | | | | |
|---|---|---|---|---|
| 7,997,555 B2* | 8/2011 | Lee | ................... | F16M 11/2021 248/371 |
| 8,215,596 B2* | 7/2012 | Duan | ................ | F16M 11/2021 16/337 |
| 8,302,917 B2* | 11/2012 | Springer | ................ | F16M 13/02 381/87 |
| 2006/0007644 A1* | 1/2006 | Huilgol | ................. | G06F 1/1616 248/917 |
| 2007/0262225 A1* | 11/2007 | Tsuo | ................... | F16M 11/105 248/676 |
| 2009/0145337 A1* | 6/2009 | Shen | ................... | H04M 1/0227 108/39 |
| 2009/0242722 A1* | 10/2009 | Lee | ................... | F16M 11/2021 248/371 |
| 2010/0065694 A1* | 3/2010 | Duan | ................... | F16M 11/10 16/386 |
| 2010/0178963 A1* | 7/2010 | Iwaki | ................... | G06F 1/1622 455/566 |
| 2011/0287815 A1* | 11/2011 | Liang | ................. | H04M 1/0227 455/575.1 |
| 2011/0287816 A1* | 11/2011 | Liang | ................. | H04M 1/0227 455/575.1 |
| 2012/0008795 A1* | 1/2012 | Springer | ................ | F16M 13/02 381/87 |
| 2015/0211675 A1 | 7/2015 | Shyu et al. | | |

\* cited by examiner

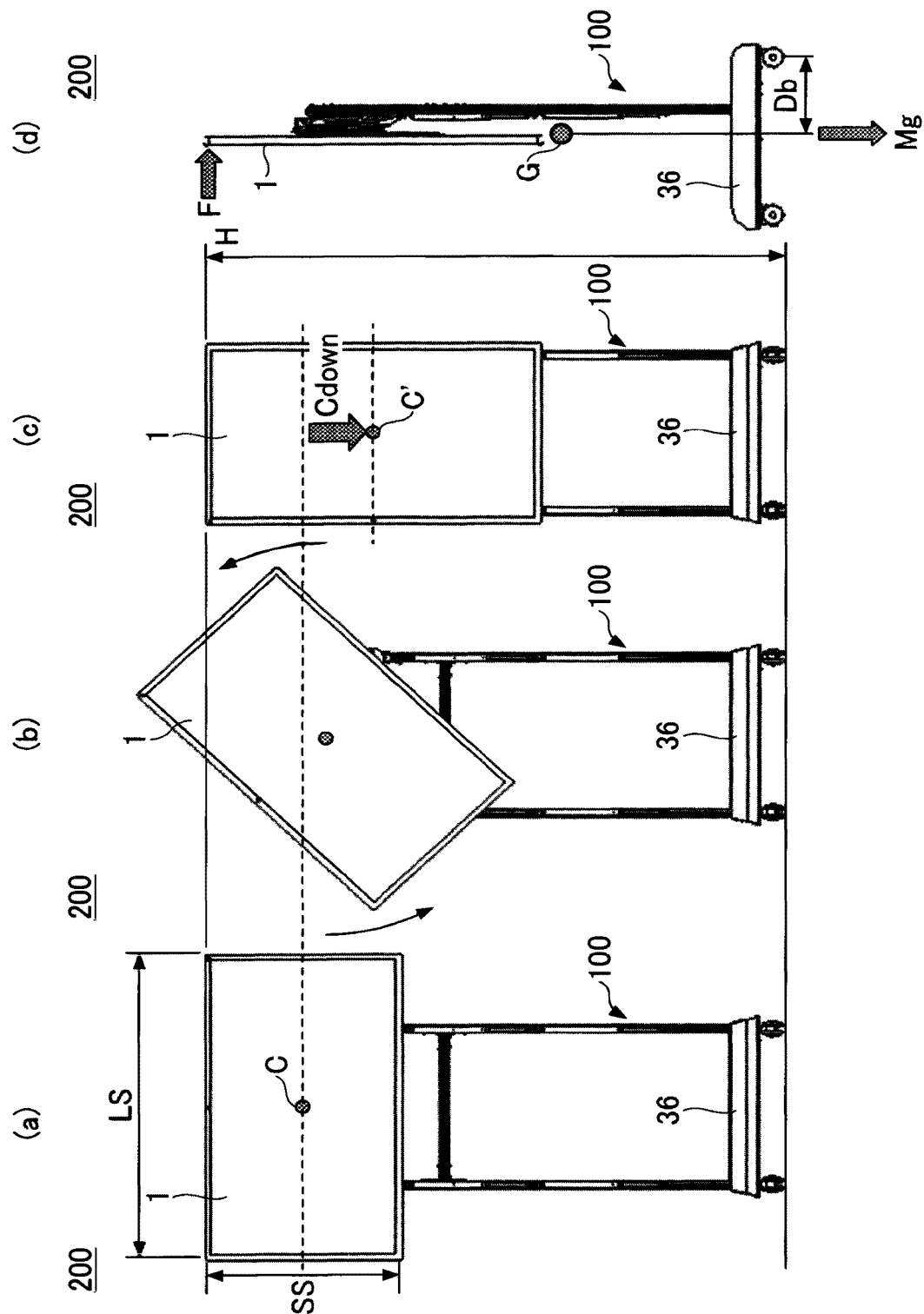

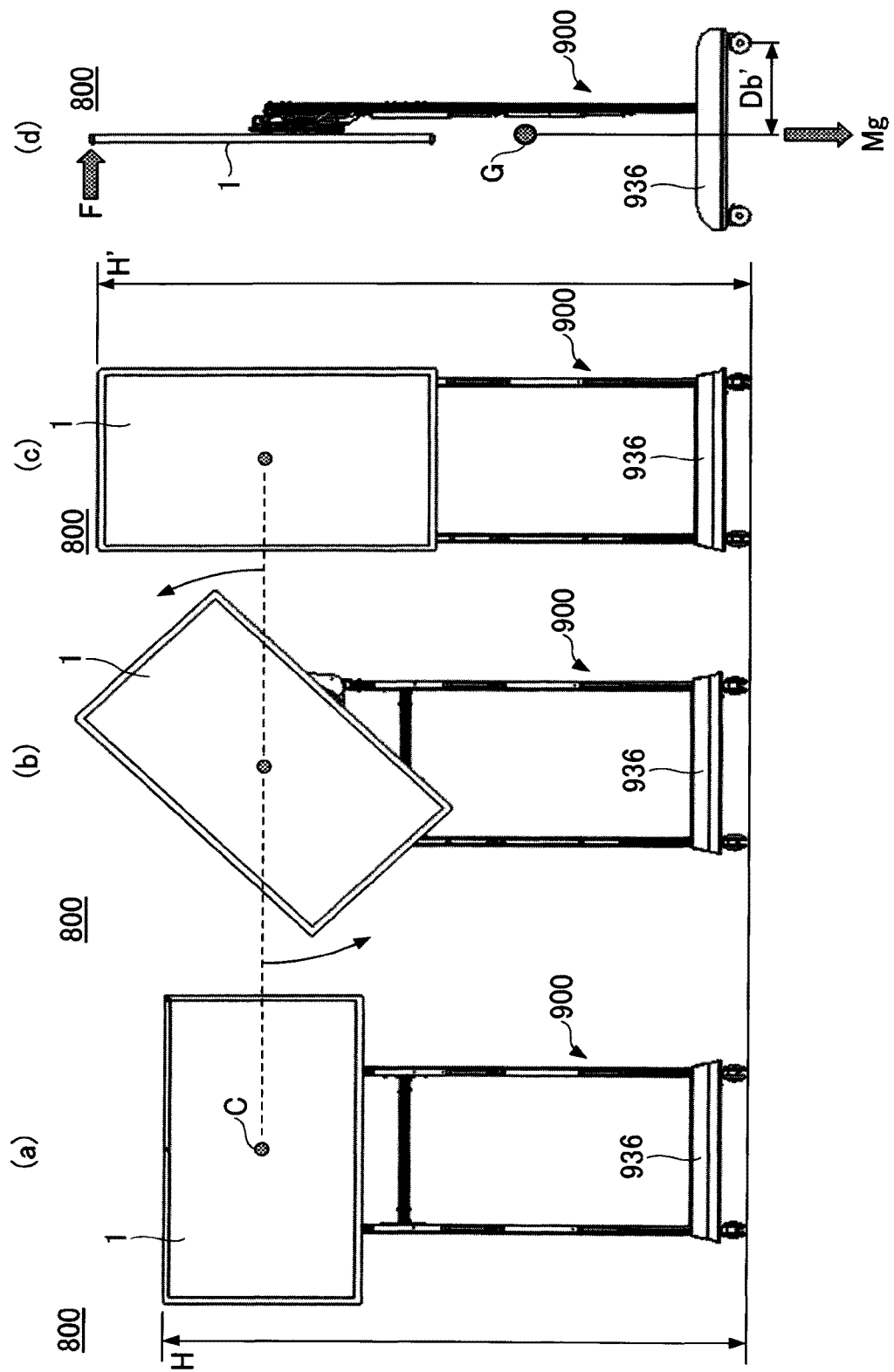

[Fig. 3A]
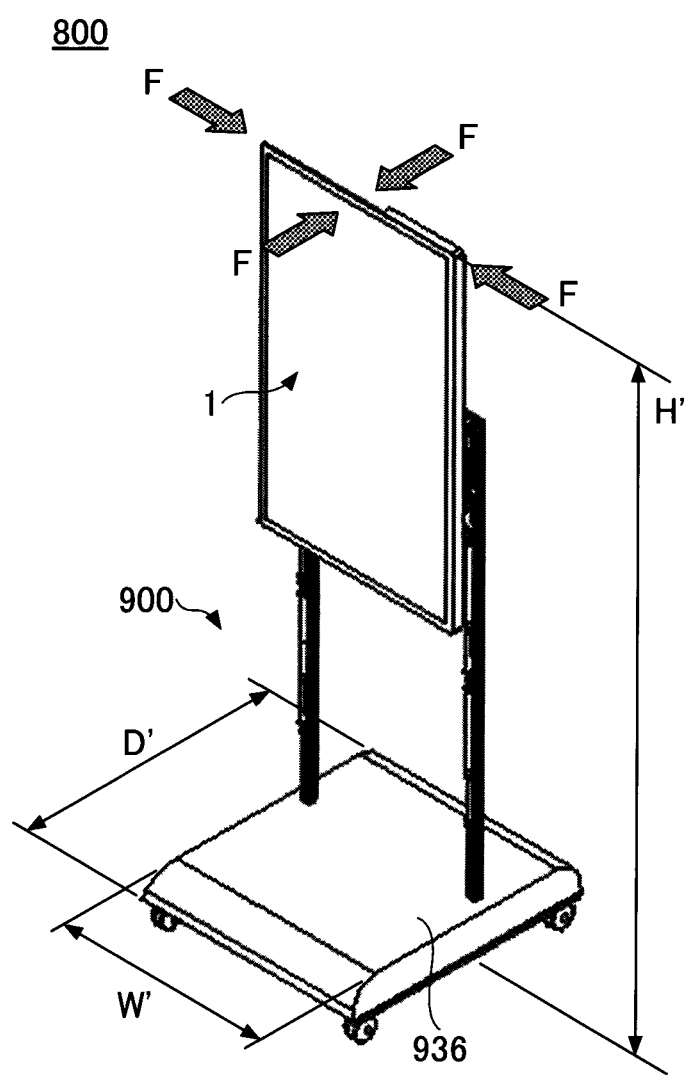

[Fig. 3B]
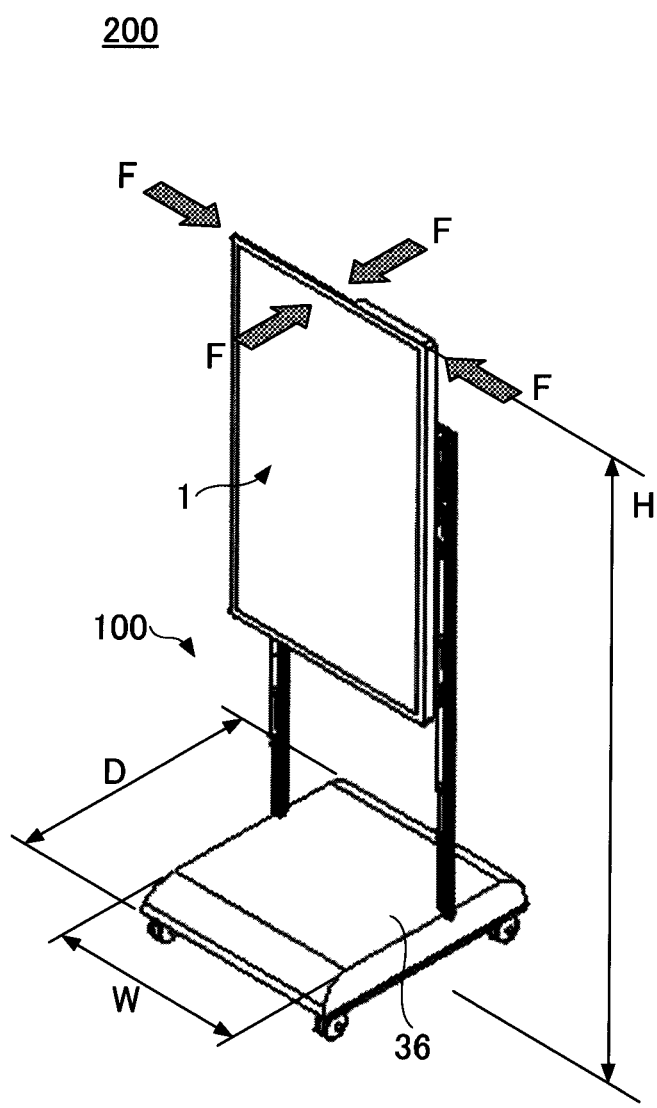

[Fig. 4]
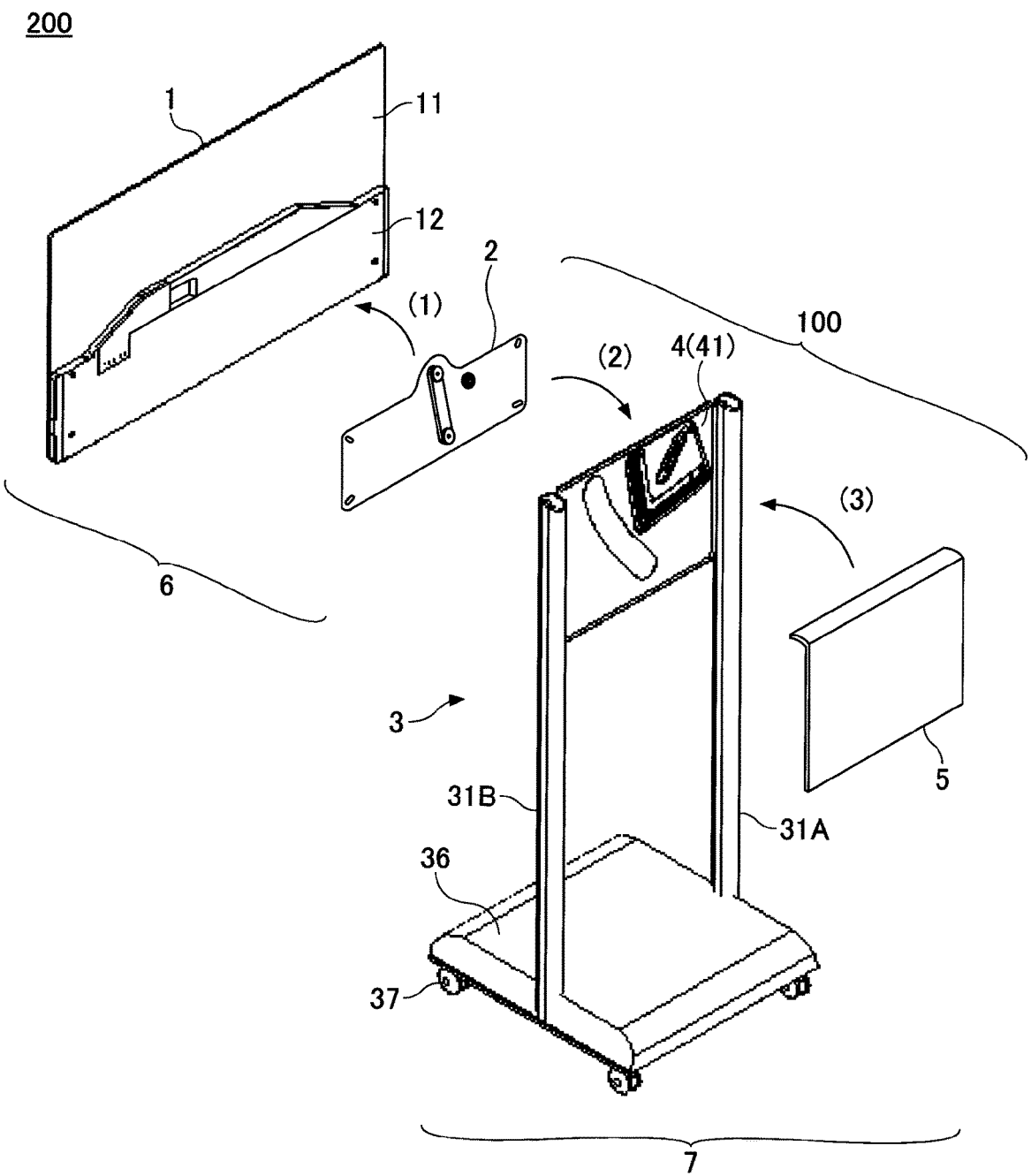

[Fig. 5]
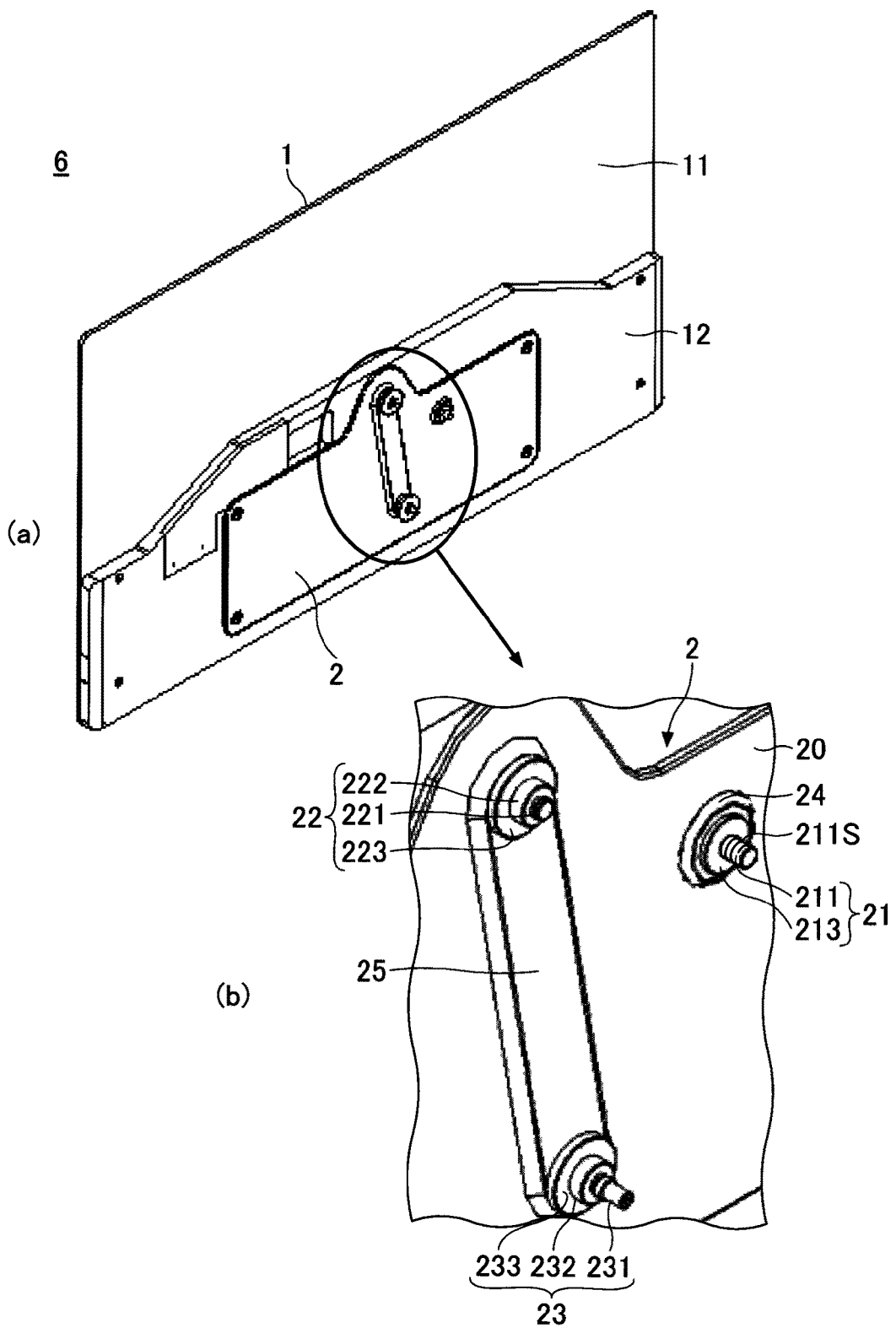

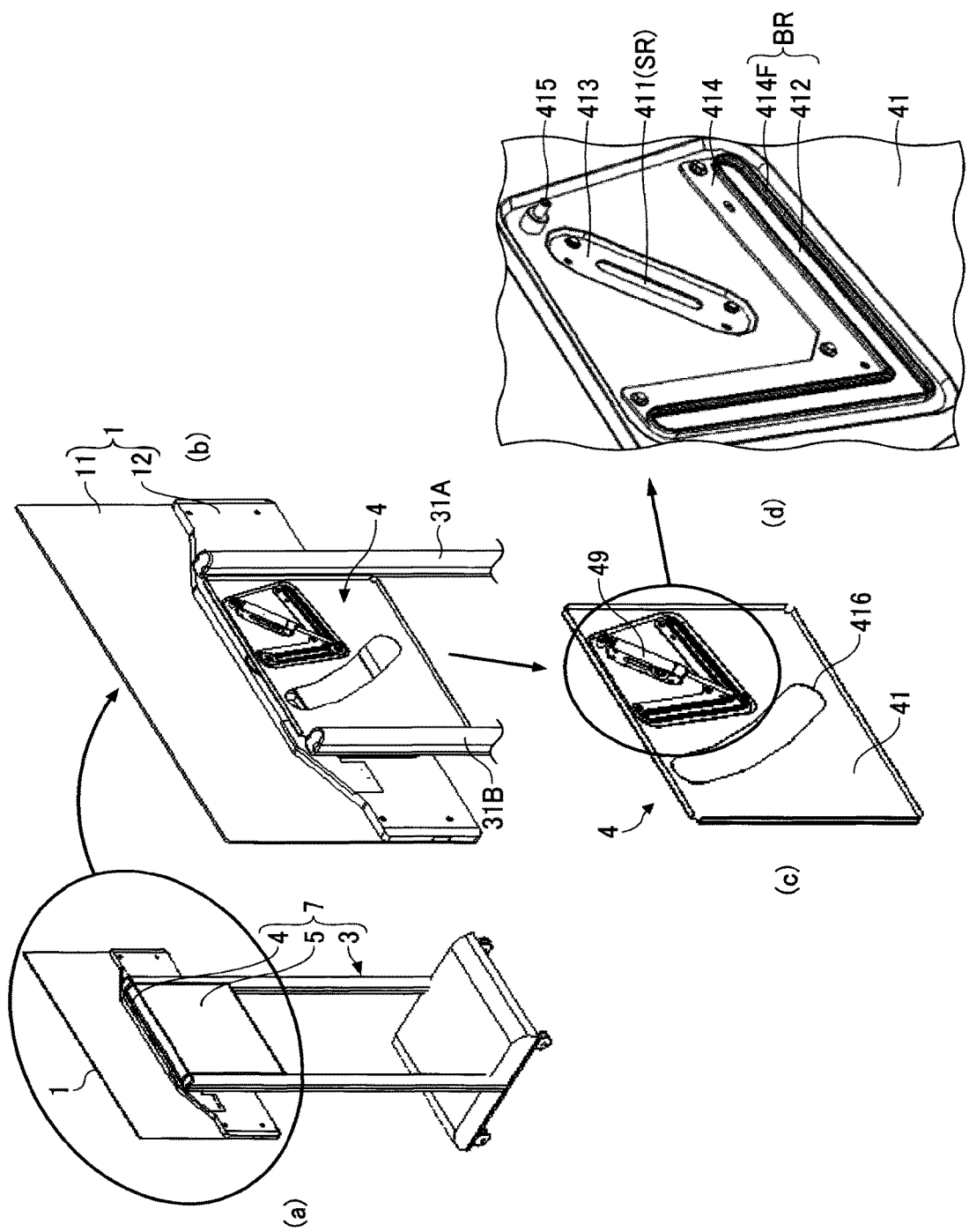

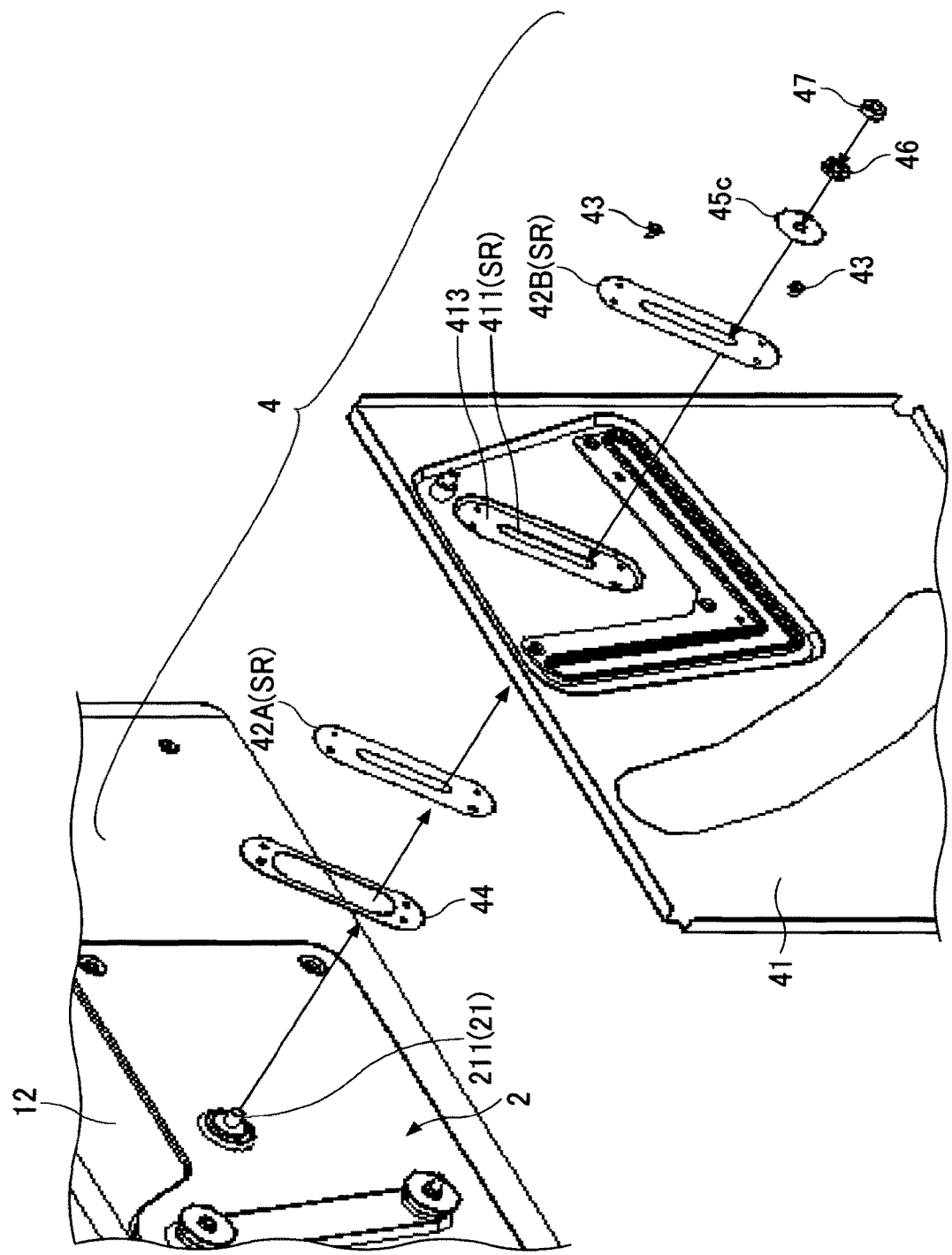
[Fig. 7]

[Fig. 8]
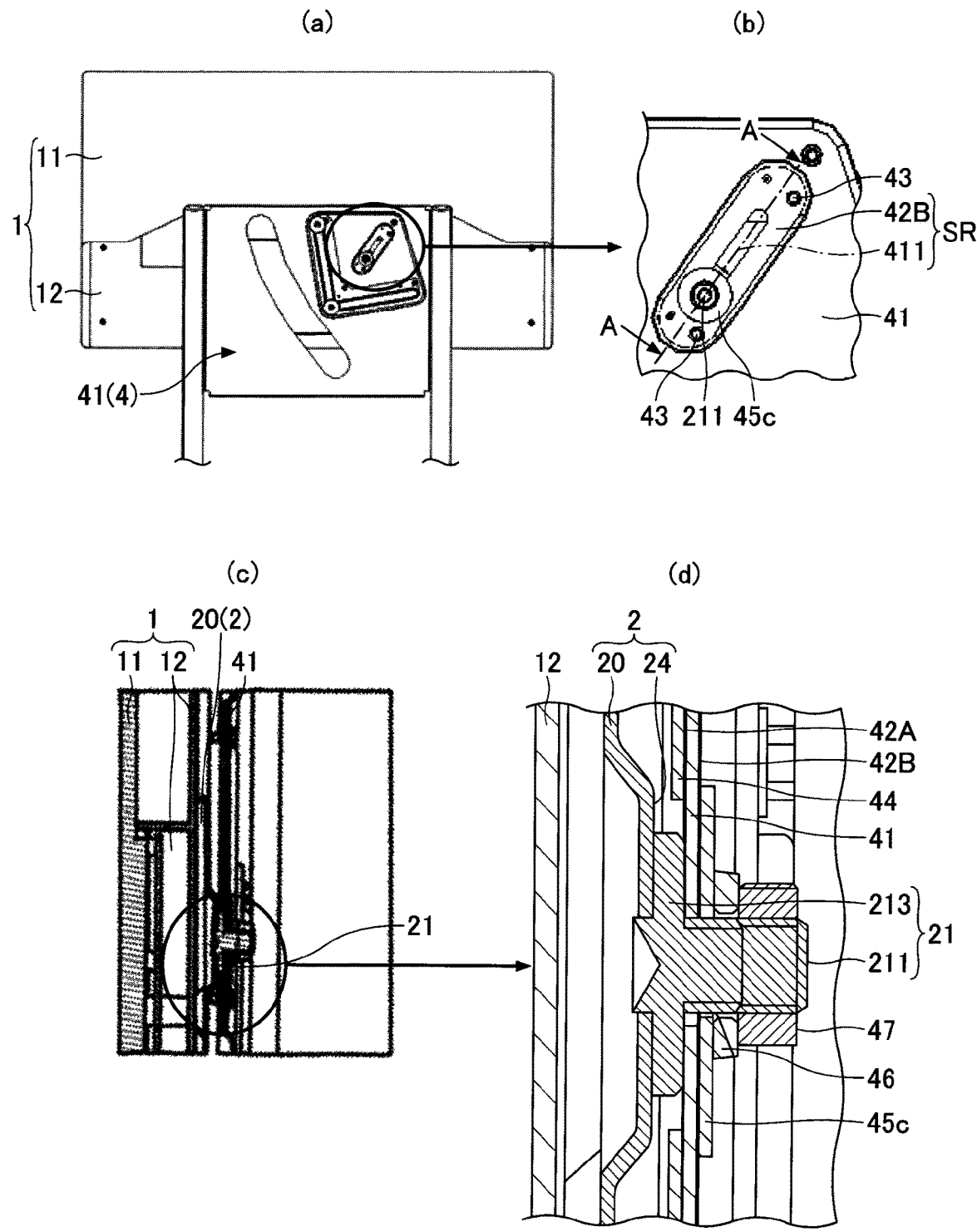

[Fig. 9A]
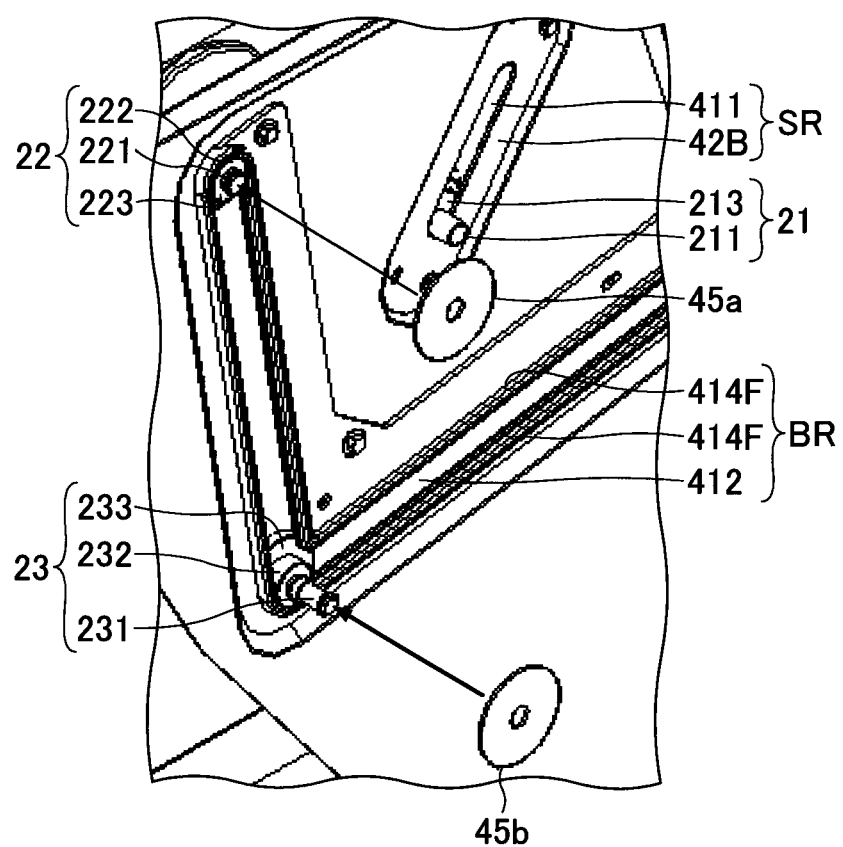

[Fig. 9B]
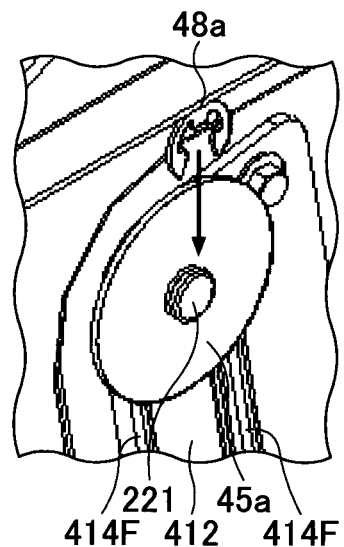
[Fig. 9C]
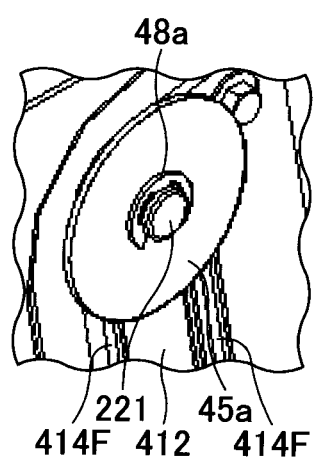

[Fig. 9D]
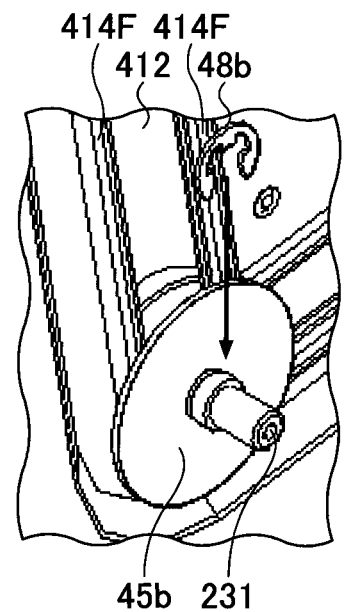
[Fig. 9E]
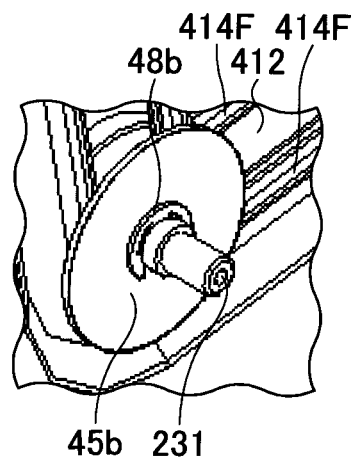

[Fig. 10]
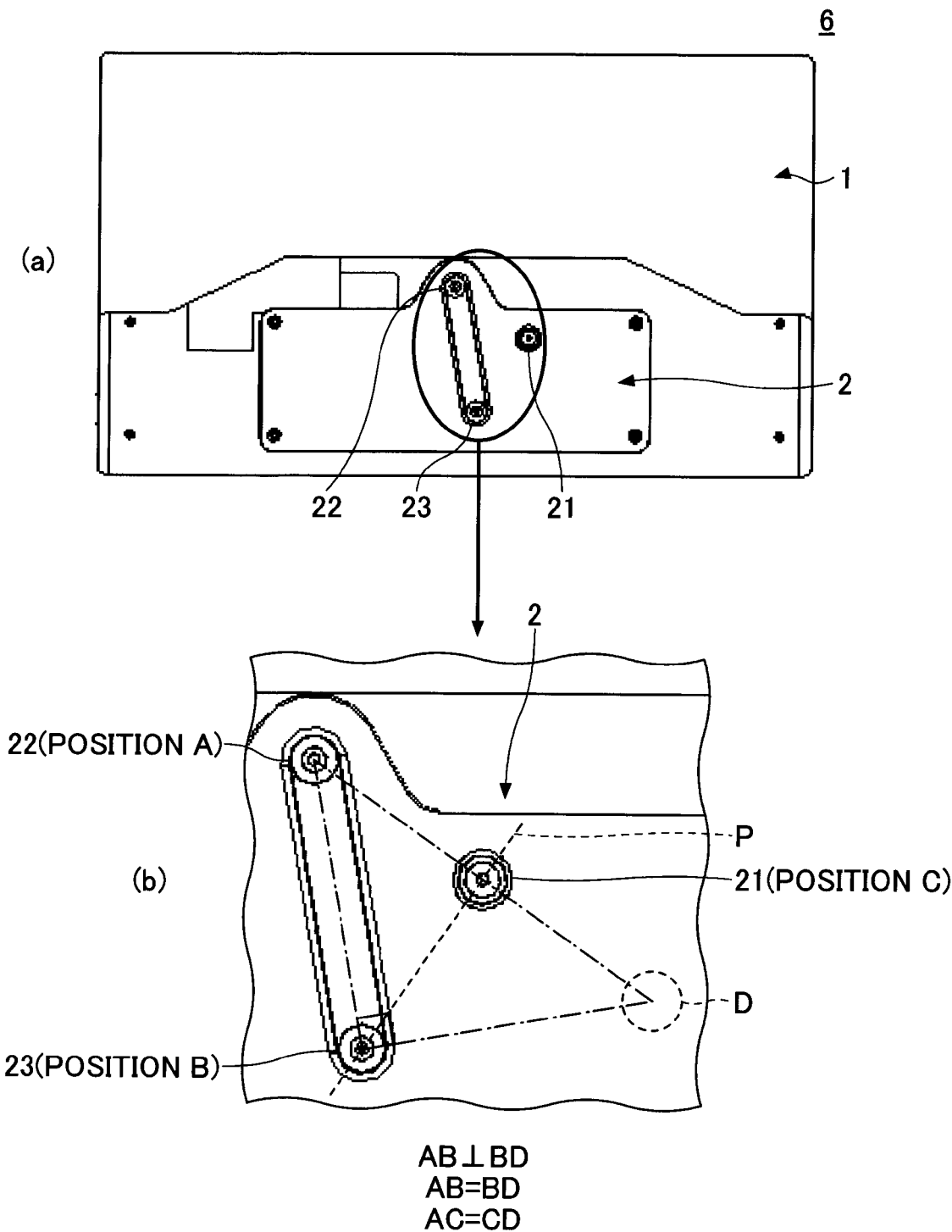

[Fig. 11]
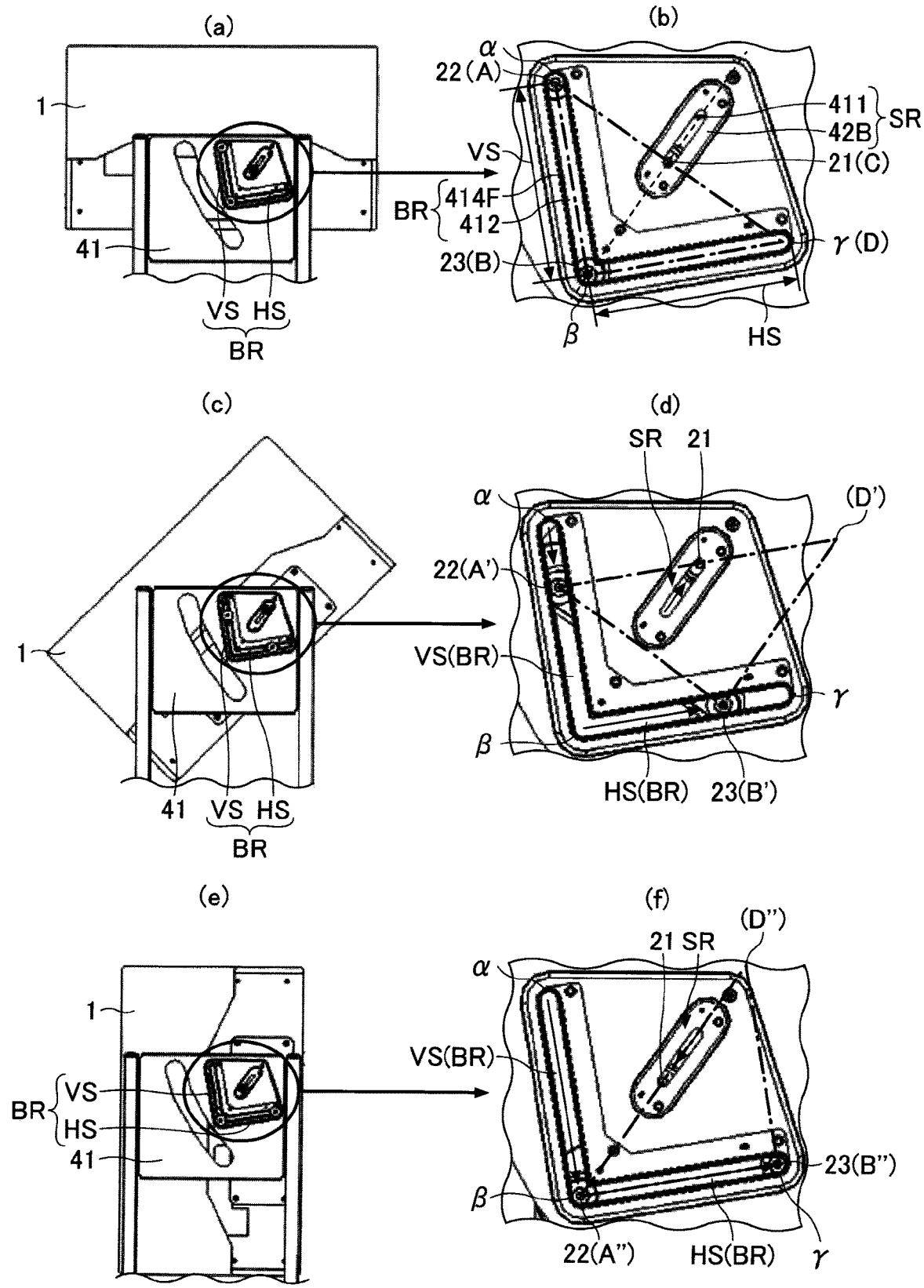

[Fig. 12]
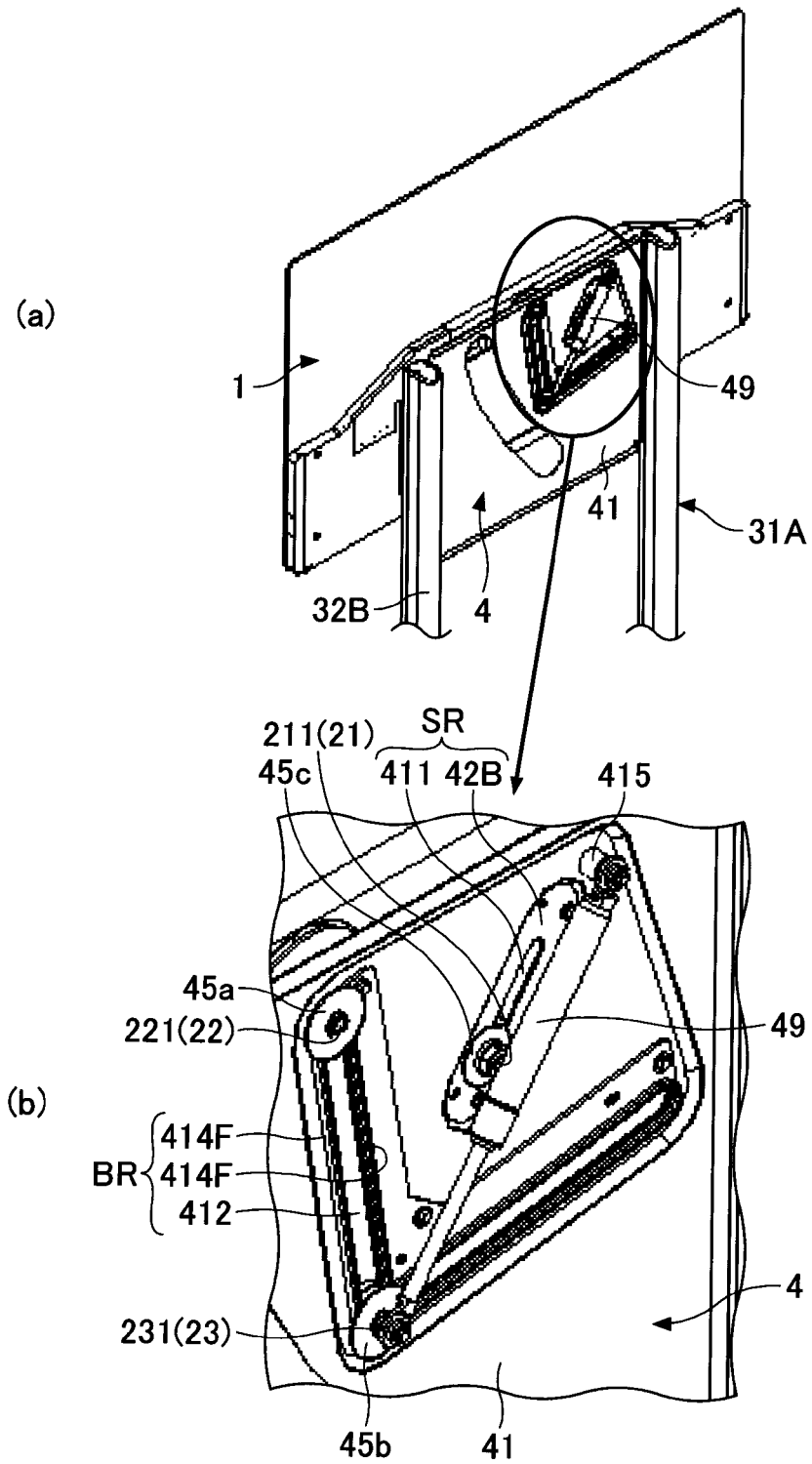

[Fig. 13]
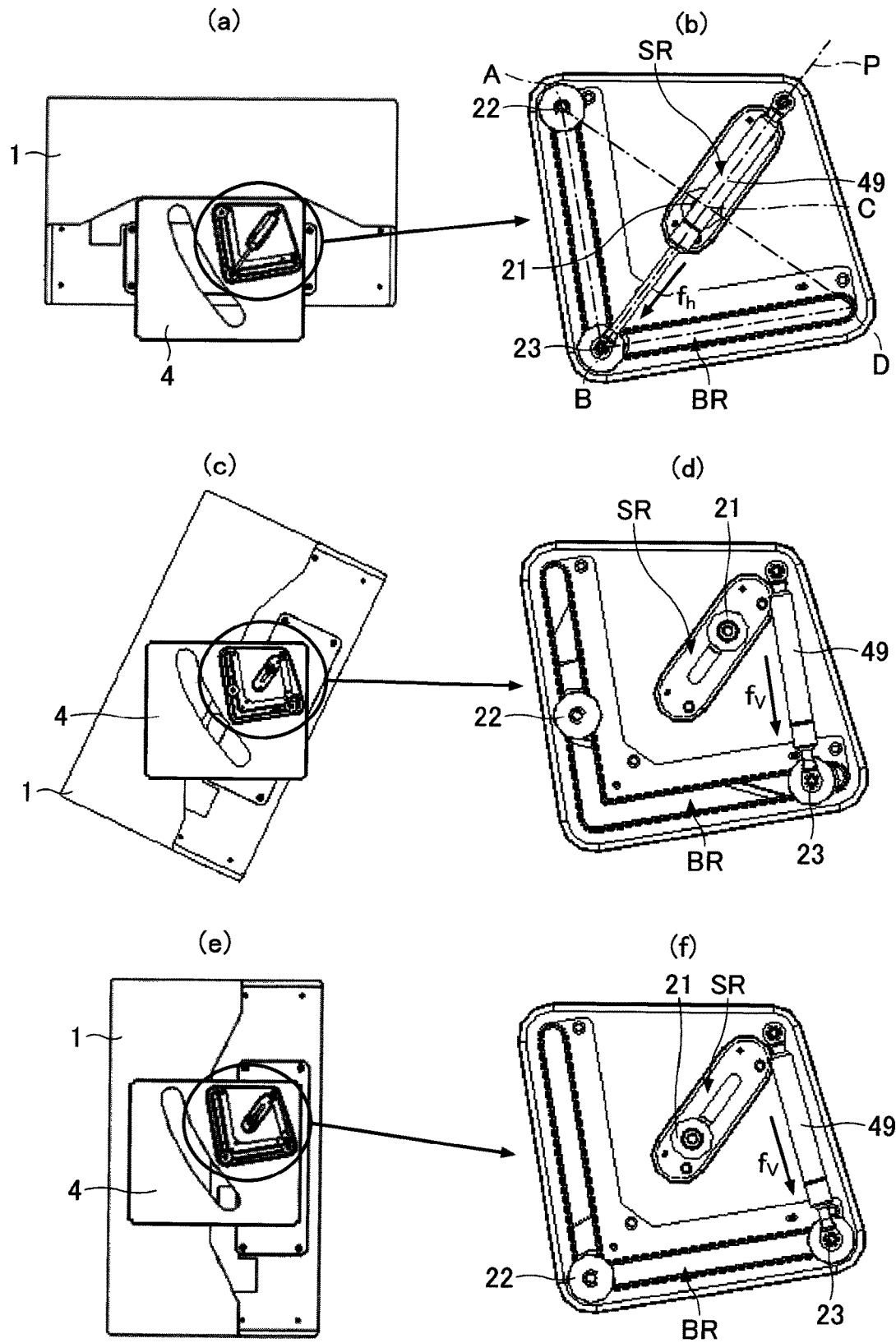

DISPLAY STAND AND DISPLAY STAND SYSTEM

CROSS-REFERENCE TO RELATED APPLICATIONS

The present application is based on PCT filing PCT/JP2020/005643, filed Feb. 13, 2020, which claims priority to JP 2019-028865, filed Feb. 20, 2019, and JP 2019-226763, filed Dec. 16, 2019, the entire contents of each are incorporated herein by reference.

TECHNICAL FIELD

The disclosure discussed herein relates to a display stand and a display stand system that includes the display stand and a display.

BACKGROUND ART

In general-purpose stands for suspending displays such as display devices, electronic whiteboards, or an analog canvas, it is common to detach a display for adjusting the height of the display or changing an installation status (e.g., a screen orientation) of the display between a horizontal (landscape) orientation and a vertical (portrait) orientation. However, there are also known stands for suspending displays having a configuration capable of adjusting the height of the display and capable of rotating the orientation of the display between the vertical orientation and the horizontal orientation without detaching the display.

For example, Japanese Unexamined Patent Publication 6-507557 discloses a stand having a configuration capable of rotating about the center of a canvas so that the canvas is rotated from a horizontally supported state to a vertically supported state.

CITATION LIST

Patent Literature

[PTL 1] Japanese Unexamined Patent Publication No. H06-507557

SUMMARY OF INVENTION

Technical Problem

However, according to the example of Patent Document 1, when the canvas is rotated to the vertical orientation, an overall length of the "canvas+stand" may become too high; in such a configuration, the stand is susceptible to fall as a result (see Patent Document 1). Thus, in order to design a stand not to fall, it was necessary to make the size of the stand base larger. In addition, when the height of a canvas is initially set to an easy-to-write position in the horizontal orientation, and the canvas is then rotated in the vertical orientation, the height of the canvas becomes too high for a user to write on.

Moreover, the stand disclosed in Patent Document 1 is configured to raise or lower the height of the canvas in addition to a rotating operation. Thus, the height of the canvas can be lowered after the rotating operation in order to prevent the stand from falling. However, a user may have a risk of forgetting to lower the height of the canvas in this configuration.

In addition, the stand disclosed in Patent Document 1 is designed to support a canvas which is a painting. However, when a stand having the same configuration is intended to support a display having electronic circuits (e.g., an interactive whiteboard, an interactive flat panel display, an electronic panel such as a touch panel, a monitor, and a television), impact may be applied to the display due to the weight of the display itself while the display is rotated or moved up and down.

Accordingly, in view of the above-described points, the present embodiment aims at providing a display stand having a configuration capable of reducing height variation of an uppermost end of a display before and after rotation when the display mounted on the display stand is rotated from a horizontal orientation to a vertical orientation without a height adjustment operation, and also capable of preventing the application of impact to the display when the orientation of the display is changed.

Solution to Problem

According to an aspect of the disclosure, a display stand for suspending a display is provided, where the display stand is operable to change an orientation of the display between a horizontally supported state and a vertically supported state without detaching and attaching the display. The display stand includes
- a stand unit having a plurality of posts and a mounting mechanism; and
- a mounting bracket mounted on a back surface of the display,
- wherein the mounting bracket includes three fixing members as first, second, and third fixing members each extending from the back surface of the display,
- wherein the mounting mechanism includes a mounting plate, the mounting plate forming at least a part of a transverse plate that connects between the plurality of posts, the mounting plate including a straight rail part having a straight slot and a bent rail part having a bent slot, the bent slot being bent at a substantially right angle, and
- wherein of the three fixing members fixed to the mounting bracket, the first fixing member engages with the straight rail part and is linearly movable when the display rotates, and the second fixing member and the third fixing member each engage with the bent rail part and are movable along straight portions of the bent rail part when the display rotates.

Advantageous Effects of the Invention

According to one aspect, when a display mounted on a display stand is rotated from a horizontal orientation to a vertical orientation without a height adjustment operation, height variation of an uppermost end of a display before and after rotation may be reduced, and impact applied to the display when the orientation of the display is changed may be prevented.

BRIEF DESCRIPTION OF DRAWINGS

FIG. 1 illustrates an exemplary display stand system according to a present embodiment;

FIG. 2 is a view illustrating a display stand system according to a comparative example;

FIG. 3A is an overall perspective view of a display stand system according to an embodiment according to the present embodiment;

FIG. 3B is an overall perspective view of a display stand system according to a comparative example;

FIG. 4 is an exploded view of a display stand system according to the present embodiment;

FIG. 5 is a back side view of a display unit with a partial enlarged view;

FIG. 6 is a view illustrating a back side of a stand system;

FIG. 7 is an exploded perspective view illustrating a fitting state between a stud of a mounting bracket and a straight slot of a joint plate;

FIG. 8 includes a back side view and a cross-sectional view illustrating a fitting state between a stud of a mounting bracket and a straight rail part of a joint plate;

FIG. 9A is a view illustrating a fitting state between two studs of a mounting bracket and a bent rail part of a joint plate;

FIG. 9B is a view illustrating a fitting state between one of the two studs of a mounting bracket and the bent rail part of the joint plate;

FIG. 9C is another view illustrating a fitting state between one of the two studs of a mounting bracket and the bent rail part of the joint plate;

FIG. 9D is a view illustrating a fitting state between the other one of the two studs of the mounting bracket and the bent rail part of the joint plate;

FIG. 9E is another view illustrating a fitting state between the other one of the two studs of the mounting bracket and the bent rail part of the joint plate;

FIG. 10 is a view illustrating a positional relationship of three studs disposed through the mounting bracket on a display;

FIG. 11 is a view illustrating the position of the three studs and the rail part during rotation;

FIG. 12 is a back side perspective view illustrating a preload member in which a back side cover is removed from the stand system; and FIG. 13 is a view illustrating positions of three studs, a rail, and a preload member during rotation.

DESCRIPTION OF EMBODIMENTS

The following illustrates an embodiment for carrying out the present invention with reference to the accompanying drawings.

In the present specification and the drawings, components having substantially the same functional configuration are denoted by the same reference numerals, and the description thereof will not be repeated.

The disclosures relate to a display stand and a display stand system including the display stand. Examples of a suspendable display used in the display stand according to the present embodiment may be as follows.

The display may be, for example, an analog board such as a white board, a blackboard, and a canvas; an input display device, which is an electronic panel such as an interactive white board, an interactive flat panel display, and a touch panel; or a passive display device such as a monitor or television.

<Overall View>

FIG. 1 is a diagram illustrating an exemplary display stand system 200 according to an embodiment of the present invention. FIG. 1 illustrates overall movement of a display stand 100 suspending a display 1 when the display 1 is rotated (pivoted). Specifically, of the display stand system 200 according to the present embodiment, FIG. 1(*a*) is a front view in which a display 1 is in a horizontal orientation, FIG. 1(*b*) is a front view in which the display 1 is moved from the horizontal orientation to a vertical orientation, FIG. 1(*c*) is a front view in which the display 1 is in the vertical orientation, and FIG. 1(*d*) is a side view in which the display 1 is in the vertical orientation.

The display 1 may be a monitor or an input screen used for a so-called electronic whiteboard device or an interactive whiteboard used in conferences, classes, meetings, and the like. The display 1 is typically suspended and held by a dedicated stand.

Requirements for a desirable display stand may be small, light-weight, and easy to move.

The size and weight of a base part (also called a stand-base) 36 is a major factor affecting the mobility of the display stand.

Further, since a display 1 of an interactive whiteboard or an electronic whiteboard is also used by a user to write on, stability of the display 1 is required upon application of a predetermined load with respect to the display stand 100.

Note that in the display stand 100, the weight and size of the base part 36 are determined according to the weight of the display 1 and the height of the uppermost end of the display 1 at the highest level.

Specifically, assuming that writing is performed on the display 1, the worst condition is a condition in which the load is applied to the uppermost end of the display 1 having the height H at the highest level.

Note that the height H of the uppermost end indicates the highest position of the display stand system 200 measured from the ground where the display stand system 200 is placed; that is, the height H of the uppermost end indicates the height of the uppermost end of the display 1 in this configuration.

Assuming that when F represents a load applied to the display 1, Mg represents a weight of the overall display stand system 200 including the display 1 and the display stand 100, and db represents a back side depth length from the center of gravity G of the display stand system 200, with respect to a depth direction of the base part 36, a condition to make the display 1 stable needs to satisfy the following formula:

$$F \times H < Mg \times db \quad (1)$$

Note that "to make a display stable" indicates a condition in which the display stand 100 will not fall backward when a load F is applied to an uppermost end at the front side of the display 1 toward its depth direction, like the force applied to the display 1 in its depth direction during writing on the display 1.

Hence, it is necessary that the higher the height H of the uppermost end of the display 1, the longer the back side depth length db is from the center of gravity G of the display stand system 200, with respect to the base part 36.

Accordingly, the display stand system 200 according to the present embodiment is configured such that when the display 1 is rotated from a horizontally supported state (or horizontal orientation) to a vertically supported state (or the vertical orientation), the height of the center C' of the display after rotation (see FIG. 1 (*c*)) automatically becomes equal to or lower than the height of the center C of the display before rotation (see FIG. 1 (*a*)). That is, the height of the center of the display 1 is supported such that the height of the center of the display 1 in the vertically supported state illustrated in FIG. 1(c) is lower than the height of the center of the display 1 in the horizontally supported state illustrated in FIG. 1(a).

Note that the height of the center C (or C') indicates an intersection point at which diagonal lines of the display 1 intersect. Specifically, the height of the center C (or C') of the display is a position at the center C in the height direction of the display 1, which is, namely, a position corresponding to the height from the ground on which the display stand system 200 is installed.

Furthermore, the height C' in the vertical orientation is configured to be lowered by the amount ($C_{down}$) obtained by the following formula (2) "(long side LS)−(short side SS)/2", with respect to the height C in the horizontal orientation. This configuration enables the height of the upper end to remain unchanged.

$$C_{down} = \{(\text{long side LS}) - (\text{short side SS})\}/2 \quad (2)$$

As illustrated in FIG. 1, the display stand 100 according to the present embodiment is configured to suspend the display 1 such that the height H of the uppermost end of the display 1 is located at the same position (same height) in both the horizontal orientation and vertical orientation.

The following describes, with reference to a comparative example, an advantageous effect of the display stand 100 according to the present embodiment in that the height of the uppermost end of the display 1 remains unchanged in both the horizontal orientation and vertical orientation.

Comparative Example

FIG. 2 illustrates a display stand system 800 according to a comparative example. In the related art stand according to the comparison example illustrated in FIG. 2, the installation state of the display 1 is changed by rotating the display 1 about the center C of the display 1 as the center of rotation. Specifically, of the display stand system 800 according to a comparative example, FIG. 2(a) is a front view in which the display 1 is in the horizontal orientation, FIG. 2(b) is a front view in which the display 1 is moving from the horizontal orientation to the vertical orientation, FIG. 2(c) is a front view in which the display 1 is in the vertical orientation, and FIG. 2(d) is a side view in which the display 1 is in the vertical orientation.

With the configuration of the display stand system 800 illustrated in FIG. 2, the height of the uppermost end of the display 1 changes, according to whether the display 1 is installed in the horizontal orientation or in the vertical orientation. Specifically, in this configuration, the height H' of the uppermost end of the display 1 in the vertical orientation is higher than the height H of the uppermost end of the display 1 in the horizontal orientation (H'>H).

Note that in determining the size and weight of a base part 936 of a display stand 900 according to the comparative example, it is necessary for the display stand 900 to withstand a load condition applied to an uppermost end portion of the display 1 supported in the vertical orientation. Thus, it is necessary to satisfy the following formula (3):

$$F \times H' < Mg \times db' \quad (3)$$

Note that in comparing the configuration according to the present embodiment with the configuration according to the comparative example, the height H' of the uppermost end of the display 1 according to the comparative example in the vertical orientation in FIG. 2 is higher than the height H of the uppermost end of the display 1 according to the present embodiment in the vertical orientation in FIG. 1 (H'>H).

Accordingly, when the above-described height relationship is applied to the formulas (1) and (3), a later described back side depth length db' of the display stand system 800 according to the comparative example is longer than a back side depth length db of the display stand system 200 according to the present embodiment already described above (db'>db). Note that in the comparative example, db' represents a back side depth length from the center of gravity G of the display stand system 800, with respect to a base part 936.

In the stand structure according to the comparison example illustrated in FIG. 2, it is necessary to increase the size and weight of the base part 936 of the display stand 900 in preparation for the display 1 to become in vertical orientation.

Note that for the actual design of the display stand, it is necessary to set the size and weight of the base part 36 to withstand not only a load applied from the front side of the display 1 but also a load applied from the back side and a load applied in a horizontal direction of the display 1.

FIGS. 3A and 3B are overall perspective views of display stand systems according to the present embodiment and a comparative example, respectively. FIG. 3A illustrates a display stand system 800 according to the comparative example, and FIG. 3B illustrates a display stand system 200 according to the present embodiment. In both cases of FIGS. 3A and 3B, a display 1 is set in the vertical orientation.

As described above, the height (H) of the uppermost end of the display 1 in the vertical orientation for the display stand 100 according to the present embodiment is lower than the height (H') of the uppermost end of the display 1 in the vertical orientation for the display stand 900 according to the comparative example (H'>H).

Thus, as illustrated in FIGS. 3A and 3B, the width W of the base part 36 according to the present embodiment is shorter than the width W' of the base part 936 according to the comparative example (W'>W), and the depth D of the base part 36 according to the present embodiment is shorter than the depth D' of the base part 936 according to the comparative example (D'>D).

Accordingly, the base part 36 of the display stand 100 according to the present embodiment illustrated in FIG. 3B is configured to be smaller and lighter in size and weight than the base part 936 of the display stand 900 according to the comparative example illustrated in FIG. 3A.

<Stand Configuration According to the Present Embodiment>

FIG. 4 is an exploded view of a display stand system 200 according to the present embodiment. The display stand system 200 according to the present embodiment includes two modules, which are a display unit 6 and a stand unit 7.

The display stand 100 for suspending the display 1 includes a mounting bracket 2 and a stand unit 7.

The following illustrates the assembly of the display stand system 200 by referring to FIG. 4. First, as illustrated in FIG. 4, the mounting bracket 2 is mounted onto a reinforcement back surface 12 in step (1). The reinforcement back surface 12 is configured to reinforce a back surface 11 of the display 1.

Note that a configuration in which the mounting bracket 2 is mounted on the display 1 is defined as a display unit 6.

Then, in step (2), the display unit 6 having the display 1 and the mounting bracket 2 is attached to a mounting mechanism 4. The mounting mechanism 4 includes a joint plate 41. The joint plate 41 acts as a transverse plate that connects a plurality of posts 31A and 31B.

In step (3), a back side cover 5 is attached to a back surface of the joint plate 41 so as to cover a fitting portion of the mounting mechanism 4.

A configuration including a support mechanism 3, the mounting mechanism 4, and the back side cover 5 is defined as a stand unit 7.

The mounting steps (1), (2) and (3) are performed only at the very first setting.

Once all the units (components) of the display stand system 200 according to the present embodiment are assembled, the display 1 is enabled to rotate and move up and down, with respect to the display stand 100. Thus, it is not necessary to attach and detach the display 1 in order to change an installation state (i.e., horizontal/vertical orientation, and height of the display 1) of the display 1, with respect to the stand unit 7.

Further, the support mechanism 3 of the stand unit 7 is provided with casters 37 beneath the base part 36, which support the posts 31A and 31B. This configuration enables the display stand system 200 to be moved (conveyed) in an assembled state. To adjust the horizontal angle (horizontal tilt) of the display 1, the orientation of the entire display stand system 200 is adjusted by the casters 37.

Further, when the display 1 is disposed vertically, the width of the display 1 is approximately the same as a distance between the posts 31A and 32B of the support mechanism 3. This configuration enables multiple same types of display stand systems 200 to be loaded without occupying substantial space in order to transport multiple same types of display stand systems 200 for exhibitions and the like.

Thus, it is possible to move the display stand system 200, rotate the display 1, and move the display up and down while the display stand system 200 is in an assembled state. In this configuration, it is not assumed that the display 1 and the display stand 100 be separated once they are assembled (after the first assembly), unless the installation place of the display is changed, for example, to install the display on a wall.

Note that in the following description, an exploded view of the display stand system 200 may be depicted in the drawings for the purpose of illustrating operation and fitting of units or components.

FIG. 5 is a view illustrating a back side of the display unit 6. Specifically, in FIG. 5, (a) is a back side perspective view of the display unit 6, and (b) is an enlarged view of a portion of the mounting bracket 2 taken from (a).

The mounting bracket 2 of the display unit 6 is provided with three studs 21, 22, and 23 each extending perpendicularly to the reinforcement back surface 12 of the display 1 in FIG. 5. Note that the mounting bracket 2 is also referred to as a display bracket 2, or a movable joint part 2.

The studs 21, 22, and 23 are respective fixing members each having a base side and a tip side, and cylindrical projections 211, 221, and 231 are disposed at the respective tip sides of the studs 21, 22, and 23.

Note that of the stud 21, a flat disk-shaped stud washer 213 is disposed at a base side (fixed side) of the cylindrical projection 211. Meanwhile, of the studs 22 and 23, sliding cylindrical members 222 and 232 having diameters larger than diameters of the cylindrical projections 221 and 231 are fitted closer to the base sides (fixed sides) of the cylindrical projections 221 and 231 than to the respective tip sides, and flat disk-shaped stud washers 223 and 233 are disposed further closer to the base sides (fixed sides) of the cylindrical projections 221 and 231.

On the back surface of a substrate plate 20 of the mounting bracket 2, a round raised portion 24, and an oblong strip-shaped raised portion 25 having round opposite ends are formed. The stud 21 is mounted such that the stud washer 213 is in close contact with a flat back surface of the round raised portion 24, and the studs 22 and 23 are mounted such that the stud washers 223 and 233 are in close contact with a flat back surface of the oblong strip-shaped raised portion 25.

A threaded area 211S having threaded grooves or threaded projections is formed on an outer circumference of a tip of the cylindrical projection 211 of the stud 21. Note that the stud 21 is a first fixing member.

The cylindrical projection 231 of the stud 23 is configured to connect with a preload member 49 (see FIG. 6(*c*)). Hence, the cylindrical projection 231 of the stud 23 is configured to be longer than the cylindrical projection 221 of the stud 22. Note that the stud 22 is a second fixing member and the stud 23 is a third fixing member.

FIG. 6 is a view illustrating a back side of the display stand system 200. In FIG. 6, (a) is a back side view of an entire display stand system 200, (b) is a partial back side view of the display stand system from which the back side cover 5 is removed, (c) is a back side view of the mounting mechanism 4, and (d) is an enlarged view of a periphery of fitting portions on the joint plate 41.

As illustrated in (a) and (b) of FIG. 6, the stand unit 7 includes the support mechanism 3, the mounting mechanism 4, and the back side cover 5. The support mechanism 3 includes the posts 31A and 31B, the base part 36, and the casters 37 (not illustrated), and the mounting mechanism 4 includes the joint plate 41, and the like. The back side cover 5 is detachable from the posts 31A and 31B, and the joint plate 41. When the display unit 6 and the stand unit 7 are assembled, the back side cover 5 is detached as illustrated in FIG. 6(*b*), and is mounted after the display unit 6 and the stand unit 7 are assembled.

As illustrated in FIG. 6(*c*), a preload member (gas spring) 49 is mounted on a back side of a joint plate (mounting plate) 41. A ventilation hole 416 is formed in the joint plate 41.

In this embodiment, the joint plate 41 is an example of a transverse plate that connects the posts 31A and 31B; however, the joint plate 41 may be configured to be attached to at least a part of a beam (a transverse bar) that connects the posts 31A and 31B. That is, the joint plate 41 may form a part of the transverse plate between the posts 31A and 31B.

Further, as illustrated in FIG. 6(*d*), an oblong straight slot 411 and an L-shaped slot 412 are formed on the joint plate 41. The L-shaped slot 412 is linearly bent approximately at a right angle. With reference to the L-shaped slot 412, "linearly bent approximately at a right angle" indicates an allowable error range of approximately ±3 degrees with respect to 90 degrees.

The straight slot 411 and L-shaped slot 412 are formed separately from each other. Further, the straight slot 411 and L-shaped slot 412 each have rounded ends.

An oblong recess 413 (also referred to as oval-shaped or track-shaped recess) is formed around the straight slot 411. Reinforcing members for the straight slot 411 are separately mounted as later-described slide resistance plates 42A, 42B (see FIG. 7). The configuration including the straight slot 411 and the slide resistance plates 42A, 42B (see FIG. 7) is defined as a straight rail part SR.

An L-shaped reinforcement plate 414 is pre-mounted around the L-shaped slot (also referred to as a bent slot) 412. The L-shaped reinforcement plate 414 may be made of a material having good sliding properties, such as resin or metal. Note that the L-shaped reinforcement plate 414 is provided with a burred flange 414F so as to rise along an edge of a through hole formed on the L-shaped reinforcement plate 414. A bent rail part BR includes the L-shaped slot 412 and the flange 414F that surrounds the L-shaped slot 412 and rises from a back surface of the joint plate 41.

Of the mounting mechanism 4, the flange 414F forms an edge of a through hole of the L-shaped reinforcement plate 414 to project from the back surface of the joint plate 41. Thus, of the joint plate 41, a combination of a through-hole thickness portion of the L-shaped slot 412, a thickness portion of the L-shaped reinforcement plate 414, and a height portion of the flange 414F functions as a sliding surface (guide rail) of the bent rail part BR for the sliding cylindrical members 222 and 232 to slide on.

In this embodiment, the flange 414F surrounding the through-hole of the L-shaped reinforcement plate 414 extends only from the back side of the joint plate 41. However, the flange 414F may be configured to extend through an inner peripheral surface of the L-shaped slot 412 to also extend from a surface side of the joint plate 41, thereby further reinforcing the L-shaped slot 412. This reinforcement structure of the flange 414F covers the entire through-hole thickness of the L-shaped slot 412 formed on the joint plate 41. Note that this structure of the flange 414F may be called an eyelet structure (also referred to as a grommet structure).

Also, a support projection 415 is formed obliquely upward of the oblong recess 413, which surrounds the straight slot 411. As illustrated in FIGS. 6 (c) and (d), one end of the preload member 49 is connected to the support projection 415.

The stud 21 illustrated in FIG. 5 is slidable along the straight slot 411, and the studs 22 and 23 are slidable along the straight portions of the L-shaped slot 412.

Connection of the three studs 21, 22, and 23 and the rail parts SR and BR that include the straight slot 411 and L-shaped slot 412 respectively will be described with reference to FIGS. 7 to 9 below.

<Connection of Straight Rail Part and Stud>

FIG. 7 is an exploded perspective view illustrating the fitting state between the stud 21 of the mounting bracket 2 and the straight slot 411 of the joint plate 41.

FIG. 8 is a back side view and a cross-sectional view illustrating a fitting state between the stud 21 of the mounting bracket 2 and the straight rail part SR of the joint plate 41. In FIG. 8, (a) is a partial back side view of the display stand system 200 from which the back side cover 5 removed, (b) is an enlarged view of the straight rail part SR and the stud 21, (c) is an A-A cross-sectional view of (b), and (d) is an enlarged view of (c).

As illustrated in FIG. 7, the joint plate 41 of the stand unit 7 includes the straight slot 411, which is an obliquely extending oblong through hole.

The joint plate 41, the studs 21, 22, and 23, and spacers 45a, 45b, and 45c (see FIGS. 9A to 9E) are made of sheet metal. Sheet metal may be made of, for example, iron, stainless steel, aluminum, or titanium, or alloys thereof.

The front and back sides of the joint plate 41 having the oblong straight slot 411 are sandwiched by two thin slide resistance plates 42A and 42B also having oblong slots of a size similar to the oblong straight slot 411, which are then fastened by screws 43 via a frame 44.

Referring to FIGS. 7 and 8(b), the joint plate 41 having the straight slot 411 and sandwiched by the two slide resistance plates 42A and 42B are fastened integrally to form a straight rail part SR.

The two slide resistance plates 42A and 42B are, for example, formed by phosphor bronze plates.

This configuration provides a smooth and stable coefficient of friction on the front and back surfaces of the straight rail part SR. In this embodiment, phosphor bronze is used as an example of a material for the slide resistance plates 42A and 42B. However, as another example of sliding material, bronze, which is typically used for a sliding part such as a torque hinge, or a bronze-based alloy containing lead, nickel, bismuth, sulfur, tin, zinc, or the like may be used insofar as the material has good surface properties and is resistant to abrasion.

It is assumed that the slide resistance plate 42A is fastened together with the frame 44 by screws (not illustrated) onto the front side (surface side) of the joint plate 41 while the slide resistance plate 42A is pressed against the joint plate 41 via the frame 44. Note that the frame 44 has a hole larger than the slot of the slide resistance plate 42A. The slide resistance plate 42B, which is fitted into an oblong recess 413 on the back side (the back surface) of the joint plate 41, is fastened by screws 43 (FIG. 7).

The stud 21 that is disposed on the display 1 via the mounting bracket 2 fits into the straight rail part SR. The slide resistance plates 42A and 42B are mounted on the straight rail part SR.

In this case, a threaded area 211S is formed on an outer periphery of a tip of the cylindrical projection 211 of the stud 21. As illustrated in FIGS. 7 to 8(d), a predetermined sliding resistance is adjustable by tightening a nut 47 via a spacer 45c and a spring washer 46 with respect to the threaded area 211S of the cylindrical projection 211 of the stud 21 in a state where the cylindrical projection 211 of the stud 21 is inserted into the straight slot 411 of the straight rail part SR.

As a result of the above-described configuration, when a moving force applied to the stud 21 while the stud 21 reciprocates on the straight rail part SR is less than the sliding resistance, the stud 21 is enabled to hold and stop the straight rail part SR partway through the reciprocating movement.

<Connection of Bent Rail Part and Two Studs>

FIGS. 9A to 9E are views illustrating the fitting states of the studs 22 and 23 at two positions of the mounting bracket 2, and the bent rail part BR of the joint plate 41. FIG. 9A illustrates a state in which the two studs 22 and 23 are inserted into the L-shaped slot 412 of the bent rail part BR, FIG. 9B illustrates a state in which a spacer 45a is attached to a tip portion of the stud (second fixing member) 22, and FIG. 9C illustrates a state in which an E-ring 48a is attached to the tip portion of the stud 22.

FIG. 9D illustrates a state where a spacer 45b is attached to a tip portion of the stud (third fixing member) 23, and FIG. 9E illustrates a state where an E-ring 48b is attached to the tip portion of the stud 23.

As illustrated in FIG. 9A, the two studs 22 and 23 attached to the display 1 through the mounting bracket 2 are inserted into the L-shaped slot 412 of the bent rail part BR formed on the joint plate 41. In this configuration, stud washers 223 and 233 disposed at respective base sides of the studs 22 and 23 are in contact with a perimeter of the L-shaped slot 412 on the front side of the joint plate 41, and respective lateral sides of the sliding cylindrical members 222 and 232 are in contact with an inner surface of the L-shaped slot 412 of the bent rail part BR and an inner surface of the flange 414F. In this state, the cylindrical projections 221 and 231 at the tip sides of the studs 22 and 23 extend further from the flange 414F.

As illustrated in FIGS. 9B and 9D, spacers 45a and 45b are inserted into the cylindrical projections 221 and 231 at the tip sides of the studs 22 and 23, respectively. At this time, the spacers 45a and 45b contact the flange 414F. Then, as illustrated in FIGS. 9C and 9E, E-rings 48a and 48b are fastened.

Such a configuration in which the E-rings 48a and 48b are fastened make the studs 22 and 23 fit in the bent rail part BR formed on the joint plate 41 in smooth and slidable manners without resistance.

Meanwhile, as illustrated in FIG. 9A, the stud 21 that is attached to one position of the display 1 via the mounting bracket 2 is inserted into the straight slot 411 of the straight rail part SR disposed on the joint plate 41. In this case, the stud washer 213 at the base side of the stud 21 contacts a perimeter of a slot formed on the front side slide resistance plate 42A, and a lateral surface at the tip side of the cylindrical projection 211 contacts an inner surface of the straight slot 411 of the straight rail part SR and inner surfaces of the slots formed on the slide resistance plates 42A and 42B. In this configuration, the cylindrical projection 211 at the tip side of the stud 21 extends further from a back side of the slide resistance plate 42B.

The spacer 45c is then inserted into the cylindrical projection 211 at the tip side of the stud 21. In this case, the spacer 45c contacts a perimeter of the slot of the back side slide resistance plate 42B. Then, as illustrated in FIG. 7, the spacer 45c is adjusted at a constant sliding resistance by fastening the nut 47 via the spring washer 46.

<Positional Relationship Between Three Studs>

FIG. 10 illustrates a positional relationship between the three studs 21, 22, and 23 disposed through the mounting bracket 2 on the display 1. Specifically, FIG. 10(a) is a back side view of the display unit 6, and FIG. 10(b) is a partially enlarged view of the mounting bracket 2 illustrating the positional relationship between the three studs 21, 22, and 23.

Referring to FIG. 10(b), A represents a position of the stud 22, B represents a position of the stud 23, and C represents a position of the stud 21, when the display 1 of the display unit 6 is in the horizontal state (horizontal orientation). In addition, in FIG. 10(b), D represents a position such that a side BD is perpendicular to a side AB and equal in length to the side AB. Of an isosceles right triangle ABD formed by positions A, B, and D, the position of the stud 21 represented by position C is located approximately at the midpoint of a side AD.

FIG. 11 is a view illustrating positions of the three studs and positions of the rail parts during one rotation of the display 1. In FIG. 11, (a) and (b) are views illustrating a horizontal orientation of the display 1, (c) and (d) are views illustrating a rotating state of the display 1, and (e) and (f) are views illustrating a vertical orientation of the display 1.

FIG. 11(b) corresponds to an enlarged view of a fitting portion of the mounting mechanism 4 illustrated in FIG. 11(a), FIG. 11(d) corresponds to an enlarged view of a fitting portion of the mounting mechanism 4 illustrated in FIG. 11(c), and FIG. 11(f) corresponds to an enlarged view of a fitting portion of the mounting mechanism 4 illustrated in FIG. 11(e). In FIG. 11, the preload member 49 is removed.

In FIG. 11, fasteners (46, 47, 48a, and 48b) are omitted from illustration in order to indicate the center positions of the studs 21, 22, and 23 more clearly.

The joint plate 41 disposed on the stand unit 7 is provided with two rail parts at two positions. The first rail part is a bent rail part BR having an L-shaped slot 412 and reinforced by a flange 414F, and the second rail part is a straight rail part SR having a straight slot 411 and sandwiched between slide resistance plates 42A and 42B.

One side VS of the bent rail part BR extends toward an approximately vertical direction, and the other side HS extends toward an approximately horizontal direction perpendicular to the side VS. Of the bent rail part BR, a position A represents an upper end α of the one side VS, a position B represents a bending point β at the intersection of the one side VS and the other side HS, and a position D represents a side end γ of the other side HS.

Note that, as illustrated in FIG. 11(b), when the display 1 is disposed in the horizontal orientation, the bent rail part BR has an L shape where two straight portions of the bent rail part BR intersect at right angles. That is, an upper end α, a bending point β, and a side end γ of the bent rail part BR are located at positions approximately equal to vertices of an isosceles right triangle ABD when the display 1 is in the horizontal orientation. Note that the isosceles right triangle ABD is formed by connecting the positions of A, B, and D.

Thus, even when the positions A and B of the studs 22 and 23 when the display 1 is in the horizontal orientation are changed to positions A" and B" of the studs 22 and 23 when the display 1 is in the vertical orientation, a side AB being equal to a side BD "AB=BD" remains unchanged. In this case, the studs 22 and 23 are positioned at respective positions of the upper end α and the bending point β when the display 1 is in the horizontal orientation, and the studs 22 and 23 are positioned at the respective positions of the bending point β and the side end γ when the display 1 is in the vertical orientation.

Note that, as illustrated in FIG. 11(a)→(c)→(e), when the display 1 is rotated from a horizontal orientation (horizontal direction) to a vertical orientation (vertical direction), the position of the stud 21 follows a reciprocating trajectory in which the stud 21 moves up and down along the straight rail part SR. Also, the stud 22 moves down along one side VS of the bent rail part BR from the upper end α to the bending point β, and the stud 23 moves along the other side HS of the bent rail part BR from the bending point β to the side end γ.

Conversely, as illustrated in FIG. 11(e)→(c)→(a), when the display 1 is rotated from a vertical orientation to a horizontal orientation, the position of the stud 21 also follows a reciprocating trajectory of moving up and down along the straight rail part SR. Then, the stud 22 moves up along one side VS of the bent rail part BR from the bending point β to the upper end α, and the stud 23 moves along the other side HS of the bent rail part BR from the side end γ to the bending point β.

The joint plate 41, which is disposed on the stand unit 7, is provided with a straight rail part SR as a rail corresponding to this trajectory of the positions of the stud 21. The straight rail part SR extends along a perpendicular bisector P (BC) of the isosceles right triangle ABD (perpendicular to the side AD) so as to coincide with a line connecting the position B and the position C, where the position C is a midpoint of the side AD.

Further, sliding resistance is generated by disposing the slide resistance plates 42A and 42B made of phosphor bronze plate on the front and back sides of the straight slot 411 for the stud 21 reciprocating on the straight rail part SR during the rotation of the display 1 to change its orientation. Therefore, when the orientation of the display 1 is changed, it is possible to maintain the position of the display 1 stopped at a position partway through rotation.

This configuration allows the display 1 to be manually changed in a horizontal or vertical orientation without the need for detachment or attachment of the display 1, and without the need for other operations other than rotation. In addition, the sliding resistance of the slide resistance plates may allow the display 1 to be stopped in any condition during a positional change, and may allow the display 1 to move without the need for a large force.

The stud (the second fixing member) 22 is positioned close to the center of gravity of the display 1.

As illustrated in FIG. 11, when the display 1 rotates from the horizontal orientation to the vertical orientation, the stud 22 moves down from the upper end α to the bending point β of the bending rail part BR; that is, the stud 22 moves substantially vertically from the position A to the position B (A⇒B) of the bending rail part BR. Thus, the center of gravity of display 1 is also lowered by the distance from the position A to the position B (A⇒B).

This center of gravity movement allows the uppermost end position of the display 1 to remain approximately unchanged when the display 1 is rotated from the horizontal orientation to the vertical orientation. Accordingly, since the upper end position of the display 1 in both the horizontal and vertical orientations are substantially the same, the size and weight of the base part 36 are determined so as to withstand a load applied to the common uppermost end position in both the horizontal and vertical orientations. As a result, it is not necessary to make the stand base (i.e., the base part 36) larger than necessary in preparation for rotating the display 1 in the vertical orientation.

<Preload Member>

FIG. 12 is a back side perspective view illustrating a preload member 49 with the back side cover 5 removed from the display stand system 200.

FIG. 12(a) is a partial view of a back side of the display 1 of the display stand system 200, and FIG. 12(b) is an enlarged view of a back side of the mounting mechanism 4.

As illustrated in FIG. 12, when the display 1 is in a horizontal orientation, a gas spring is disposed so as to cover the stud 21 and the straight rail part SR disposed on the mounting bracket 2. The gas spring is an example of a preload member 49 for applying a preload force.

Specifically, as illustrated in FIG. 12(b), one end of the preload member 49 is coupled to a support projection 415 disposed diagonally above the straight slot 411 of the joint plate 41, and the other end of the preload member 49 is coupled to the cylindrical projection 231 of the stud 23, which is the third fixing member. In this configuration, the preload member 49 is disposed at a position in line with the perpendicular bisector P (BC) of the isosceles right triangle ABD (perpendicular to the side AD) when the display 1 is in the horizontal orientation (see FIG. 13(b)).

FIG. 13 is a view illustrating a position of three studs, rails, and a preload member during rotation.

In FIGS. 13, (a) and (b) are views illustrating the horizontal orientation of the display 1, (c) and (d) are views illustrating the rotating state of the display 1, and (e) and (f) are views illustrating the vertical orientation of the display 1.

FIG. 13(b) corresponds to an enlarged view of the fitting portion of the mounting mechanism 4 of FIG. 13(a), FIG. 13(d) corresponds to an enlarged view of the fitting portion of the mounting mechanism 4 of FIG. 13(c), and FIG. 13(f) corresponds to an enlarged view of the fitting portion of the mounting mechanism 4 of FIG. 13(e).

In this configuration, as illustrated in FIG. 13(b), when the display 1 is in the horizontal orientation, a preload force exerts a moment fh in the horizontal rotation direction. Conversely, as illustrated in FIG. 13(f), when the display 1 is in the vertical orientation, a preload force exerts a moment fv in a vertical rotation direction. In addition, as illustrated in FIG. 13(d), during rotation, a moment fv is applied in the vertical rotation direction.

The sliding resistance of the slide resistance plates 42A and 42B on which the stud 21 slides is set to be greater than the resultant force of the moment exerted by the preload force and the moment exerted by the gravity of the display 1. In the absence of the preload member 49, for the display 1 being used in the horizontal orientation for a long time, due to gravitational moment of the display 1 acting in the vertical rotation direction. Thus, the position of the display 1 might potentially vary over time.

Accordingly, by disposing the preload member 49, the horizontal moment fh is applied when the display 1 is in the horizontal orientation as illustrated in FIG. 13(b), and conversely, as illustrated in FIG. 13(f), the vertical moment fv is applied when the display 1 is in the vertical orientation. This configuration will provide an advantageous effect of maintaining the position of the display 1 stably for a long time.

As described above, with this configuration of the display stand system, a user can manually change the orientation of the display 1 without using a large force and without accidentally detaching of the display 1. Thus, it is possible to readily and stably move the stand that suspends the display 1 even through a narrow passage or even on small steps. Further, it is possible to change the orientation of the display 1 at an optimal position in accordance with various situations, such as when a user is writing on the display 1 or when a user is presenting a document on the display 1 for other people.

In addition, a preload force of the preload member 49 and the frictional resistance of the slide resistance plates 42A and 42B enable the display stand according to the present embodiment to maintain the position of the display 1 when the orientation of the display 1 is changed, while preventing the display 1 from being subjected to an impact when the orientation of the display 1 is changed.

While the preferred embodiment of the invention has been described in detail above, the invention is not limited to the particular embodiment, and various alterations and modifications are possible within the scope of the spirit of the embodiments of the invention as defined in the appended claims.

REFERENCE SIGNS LIST 1 display
2 mounting bracket (display bracket)
3 support mechanism
4 mounting mechanism
5 back side cover
6 display unit
7 stand unit
11 back surface
21 stud (fixing member, first fixing member)
22 stud (fixing member, second fixing member)
23 stud (fixing member, third fixing member)
211,221,231 cylindrical projections
222,232 sliding cylindrical members
213,223,233 stud washers
211S threaded area
31A,31B posts
36 base part (stand base)
37 casters
41 joint plate (mounting plate)

42A,42B slide resistance plates
411 straight slot (slot)
412 L-shaped slot (slot)
414F flange
C center of display
G center of gravity of display stand system
SR straight rail part
BR bent rail part
100 display stand
200 display stand system
C center of display in a horizontal orientation
C' center of display in a vertical orientation
D depth length of base part
db a back side depth length from the center of gravity with respect to a base part
Mg weight of display stand system
LS long side of display
SS short side of display
ABD isosceles right triangle
A position of stud 22 in a horizontal orientation
B position of stud 23 in a horizontal orientation
C position of stud 21 in a horizontal orientation
P(BC) perpendicular P (BC)

The present application is based on and claims priority of Japanese Priority Application No. 2019-028865 filed on Feb. 20, 2019, and Japanese Priority Application No. 2019-226763 filed on Dec. 16, 2019, the entire contents of which are hereby incorporated herein by reference.

The invention claimed is:

1. A display stand for suspending a display, the display stand being operable to change an orientation of the display between a horizontally supported state and a vertically supported state without detaching and attaching the display, the display stand comprising:
a stand unit having a plurality of posts and a mounting mechanism; and
a mounting bracket mounted on a back surface of the display,
wherein the mounting bracket includes three fixing members as first, second, and third fixing members each extending from the back surface of the display,
wherein the mounting mechanism includes a mounting plate, the mounting plate forming at least a part of a transverse plate that connects between the plurality of posts, the mounting plate including a straight rail part having a straight slot and a bent rail part having a bent slot, the bent slot being bent at a substantially right angle, and
wherein of the three fixing members fixed to the mounting bracket, the first fixing member engages with the straight rail part and is linearly movable when the display rotates, and the second fixing member and the third fixing member each engage with the bent rail part and are movable along straight portions of the bent rail part when the display rotates.

2. The display stand according to claim 1,
wherein the mounting plate includes a slot forming the straight rail part,
the mounting plate includes two slide resistance plates each having a slot of similar size as the slot forming the straight rail part such that the two slide resistance plates are fixed to a front surface and a back surface of the mounting plate, respectively, around the slot forming the straight rail part, and
a contact portion between the first fixing member and each of the slide resistance plates has a predetermined slide resistance.

3. The display stand according to claim 2,
wherein the first fixing member has a base side fixed to the mounting bracket and a tip side extending from the back surface of the display, the base side being provided with a disk, the tip side being provided with a cylindrical projection, the cylindrical projection having a diameter smaller than a diameter of the disk of the first fixing member, and
a threaded area is formed on an outer periphery of a tip portion of the cylindrical projection,
wherein a sliding resistance is adjustable by tightening a nut via a spacer and a spring washer with respect to the threaded area of the cylindrical projection of the first fixing member in a state where the cylindrical projection is inserted into the slot of the straight rail part, the straight rail part including the mounting plate being sandwiched by the two slide resistance plates.

4. The display stand according to claim 3,
wherein the disk and the cylindrical projection of the first fixing member, and the spacer are made of iron, stainless steel, aluminum or titanium, or alloys thereof, and
wherein the two slide resistance plates are made of phosphor bronze.

5. The display stand according to claim 1,
wherein when A, B, and C represent respective positions of the first, second, and third fixing members, and D represents a position such that a side BD is perpendicular to a side AB, and the side BD is equal in length to a side AB,
the position of the first fixing member represented by the C indicates a midpoint of a side AD of an isosceles right triangle ABD, the isosceles right triangle ABD being formed by connecting the A, the B, and the D.

6. The display stand according to claim 5,
wherein an upper end, a bending point, and a side end of the bent rail part are located at positions substantially equal to vertices of the isosceles right triangle ABD,
one side of the bent rail part extends toward a substantially vertical direction and the other side of the bent rail part extends toward a direction perpendicular to the one side, and
the straight rail part extends obliquely along a perpendicular BC of the isosceles right triangle ABD when the display is in the horizontally supported state, and
wherein when the display is rotated from the horizontally supported state to the vertically supported state,
the first fixing member moves reciprocally up and down along the straight rail part,
the second fixing member moves along the one side of the bent rail part from the upper end to the bending point, and
the third fixing member moves along the other side of the bent rail part from the bending point to the side end.

7. The display stand according to claim 2,
wherein the mounting mechanism includes a preload member configured to apply tension to the second fixing member or the third fixing member that moves along the bent rail part during rotation of the display.

8. The display stand according to claim 7,
wherein when A, B, and C represent respective positions of the first, second, and third fixing members, and D represents a position such that a side BD is perpendicular to a side AB, and the side BD is equal in length to the side AB,
an upper end, a bending point, and a side end of the bent rail part are located at positions substantially equal to vertices of an isosceles right triangle ABD, the isosceles right triangle ABD being formed by connecting the A, the B, and the D, one end of the preload member is coupled to a projection at a position in line with a perpendicular bisector BC of the isosceles right triangle ABD, and obliquely above the straight rail part, and the other end of the preload member is coupled to a cylindrical projection of the third fixing member, the third fixing member having a base side fixed to the mounting bracket and a tip side extending from the back surface of the display, the base side being provided with a disk, the tip side being provided with the cylindrical projection, and the cylindrical projection of the third fixing member having a diameter smaller than a diameter of the disk of the third fixing member.

9. A display stand system comprising:

a display; and the display stand according to claim 1, wherein the display and the mounting bracket attached to the back surface of the display form a display unit, and the display is rotatable between the horizontally supported state and the vertically supported state by using the mounting mechanism and the mounting bracket.

* * * * *